US012668138B2

(12) United States Patent
Mathews et al.

(10) Patent No.: US 12,668,138 B2
(45) Date of Patent: Jun. 30, 2026

(54) SERVICEABLE POWER INLET CONNECTOR

(71) Applicant: Aptiv Technologies AG, Schaffhausen (CH)

(72) Inventors: Thomas Mathews, Cortland, OH (US); Don E. Bizon, Boardman, OH (US); William C. Lovitz, Niles, OH (US); Troy A. Iler, Salem, OH (US); Mark Fredrickson, Rootstown, OH (US)

(73) Assignee: Aptiv Technologies AG, Schaffhausen (CH)

(*) Notice: Subject to any disclaimer, the term of this patent is extended or adjusted under 35 U.S.C. 154(b) by 939 days.

(21) Appl. No.: 17/939,844

(22) Filed: Sep. 7, 2022

(65) Prior Publication Data

US 2023/0085351 A1 Mar. 16, 2023

Related U.S. Application Data

(60) Provisional application No. 63/243,036, filed on Sep. 10, 2021.

(51) Int. Cl.
B60L 53/16 (2019.01)
H01R 13/502 (2006.01)
(Continued)

(52) U.S. Cl.
CPC ............ B60L 53/16 (2019.02); H01R 13/502 (2013.01); H01R 13/514 (2013.01); H01R 31/06 (2013.01); H01R 2201/26 (2013.01)

(58) Field of Classification Search
CPC ..... B60L 53/16; H01R 4/48275; H01R 43/22; H01R 13/502; H01R 13/514; H01R 2201/26
See application file for complete search history.

(56) References Cited

U.S. PATENT DOCUMENTS 9,263,826 B2* 2/2016 Wu .................... H01R 13/5841
9,478,921 B2* 10/2016 Osawa ................... H01R 13/42
(Continued)

FOREIGN PATENT DOCUMENTS

CN 1518160 A 8/2004
CN 108987996 A 12/2018
(Continued)

OTHER PUBLICATIONS

"Extended European Search Report", mailed on Feb. 2, 2023, 10 Pages.
(Continued)

*Primary Examiner* — Marcus E Harcum
(74) *Attorney, Agent, or Firm* — Billion & Armitage

(57) ABSTRACT

A power inlet connector assembly configured for use in charging an electrical vehicle includes a housing subassembly containing a plurality of direct current (DC) electrical terminals configured to mate with corresponding direct current electrical terminals of a power outlet connector of an electrical vehicle charging device external to the electrical vehicle and a cover subassembly configured to be connected and disconnected from the housing subassembly. The cover subassembly contains electrical bus bars and alternating current (AC) electrical terminals having first ends configured to mate with corresponding AC electrical terminals of a power outlet connector of an electrical vehicle charging device. The electrical bus bars are configured to be connected and disconnected with the DC electrical terminals and the AC electrical terminals are configured to be inserted and removed from terminal cavities defined by the housing subassembly.

20 Claims, 8 Drawing Sheets

(51) Int. Cl.
    *H01R 13/514*         (2006.01)
    *H01R 31/06*         (2006.01)

(56)         References Cited

U.S. PATENT DOCUMENTS

| | | | | |
|---|---|---|---|---|
| 10,243,298 | B2 * | 3/2019 | Kawai | H01R 12/65 |
| 10,675,988 | B2 * | 6/2020 | Fuehrer | B60L 53/16 |
| 11,121,493 | B2 * | 9/2021 | Lyon | H01R 43/22 |
| 11,285,832 | B2 * | 3/2022 | Rhodes | H01R 13/502 |
| 11,303,073 | B2 * | 4/2022 | Rhodes | H01R 4/56 |
| 11,654,785 | B2 * | 5/2023 | Genece | H02J 7/02 |
| | | | | 439/587 |
| 11,664,621 | B2 * | 5/2023 | Matsushita | H01R 13/50 |
| | | | | 439/701 |
| 11,846,475 | B2 * | 12/2023 | Hitchcock | F28F 9/0253 |
| 11,919,409 | B2 * | 3/2024 | Peterson | B60L 53/10 |
| 2019/0044267 | A1 * | 2/2019 | Lui | H01R 13/665 |
| 2020/0067237 | A1 * | 2/2020 | Sarraf | H01R 13/6683 |
| 2020/0153173 | A1 * | 5/2020 | Kurita | H01R 13/5219 |
| 2020/0313328 | A1 | 10/2020 | Mathews et al. | |
| 2021/0021077 | A1 | 1/2021 | Mathews et al. | |
| 2021/0075150 | A1 * | 3/2021 | Mathews | H01R 13/521 |
| 2021/0347270 | A1 * | 11/2021 | Cole | B60L 53/16 |
| 2022/0055490 | A1 | 2/2022 | Mathews et al. | |
| 2022/0250491 | A1 * | 8/2022 | Fuehrer | H01R 13/5227 |
| 2022/0332198 | A1 * | 10/2022 | Rhodes | B60L 53/18 |
| 2023/0057953 | A1 * | 2/2023 | Rhodes | B60L 53/16 |
| 2023/0116836 | A1 * | 4/2023 | Rhodes | B60L 53/11 |
| | | | | 320/109 |
| 2023/0246405 | A1 * | 8/2023 | Hitchcock | H02J 7/0042 |
| | | | | 439/655 |
| 2024/0075829 | A1 * | 3/2024 | Rowland | B60L 53/11 |

FOREIGN PATENT DOCUMENTS

| | | | | |
|---|---|---|---|---|
| CN | 111585097 | A | 8/2020 | |
| CN | 113287231 | A | 8/2021 | |
| DE | 202013012354 | U1 | 6/2016 | |
| DE | 102016105308 | A1 * | 9/2017 | B60L 53/16 |
| DE | 102021123847 | A1 * | 3/2022 | B60L 53/16 |
| KR | 20210128171 | A * | 10/2021 | H01R 13/6581 |

OTHER PUBLICATIONS

"First Office Action for CN Application No. 202211109386.0"; CNIPA; mailed on Mar. 4, 2026, 24 Pages.

* cited by examiner

102

202

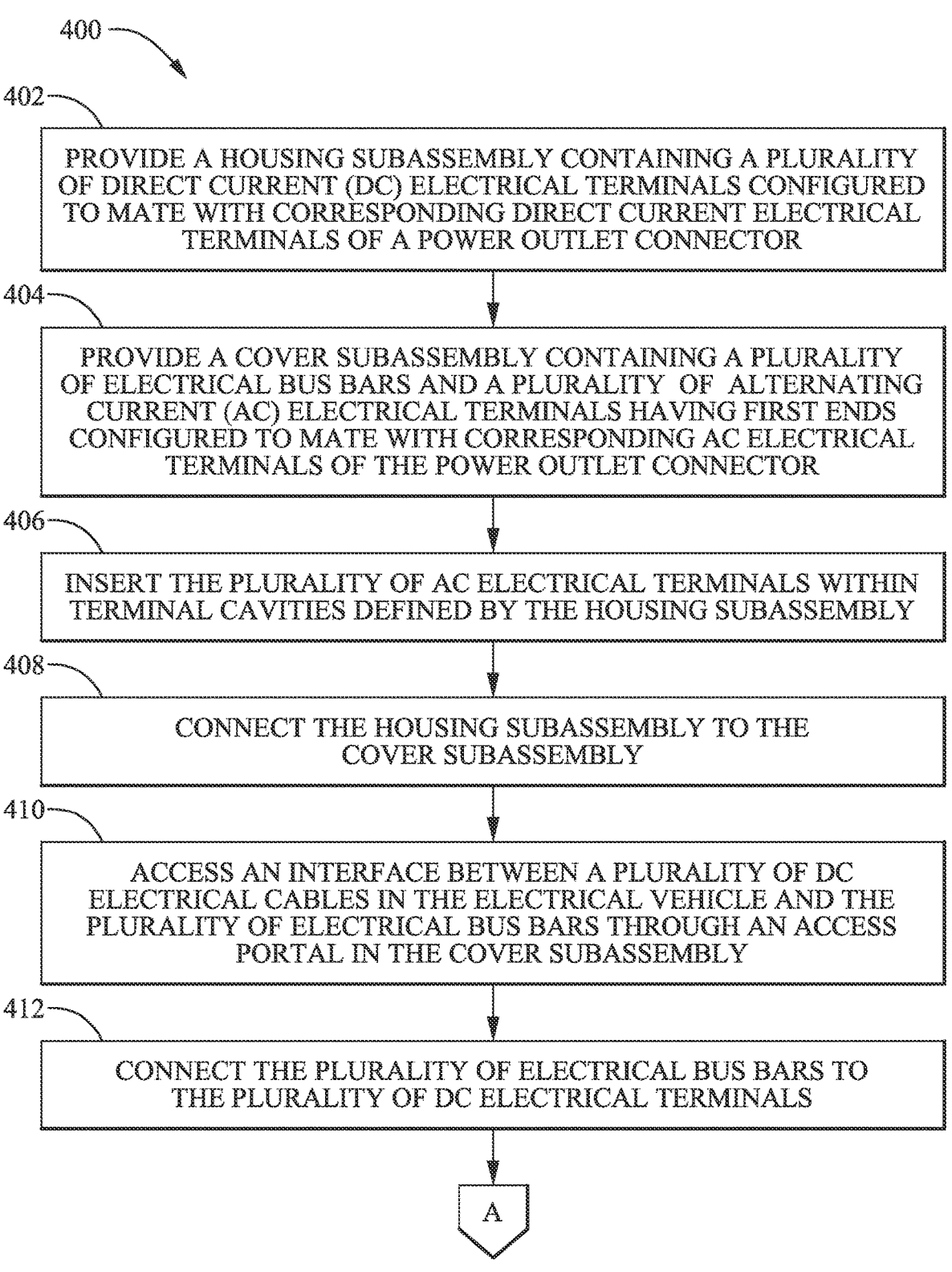

400

402

PROVIDE A HOUSING SUBASSEMBLY CONTAINING A PLURALITY OF DIRECT CURRENT (DC) ELECTRICAL TERMINALS CONFIGURED TO MATE WITH CORRESPONDING DIRECT CURRENT ELECTRICAL TERMINALS OF A POWER OUTLET CONNECTOR

404

PROVIDE A COVER SUBASSEMBLY CONTAINING A PLURALITY OF ELECTRICAL BUS BARS AND A PLURALITY OF ALTERNATING CURRENT (AC) ELECTRICAL TERMINALS HAVING FIRST ENDS CONFIGURED TO MATE WITH CORRESPONDING AC ELECTRICAL TERMINALS OF THE POWER OUTLET CONNECTOR

406

INSERT THE PLURALITY OF AC ELECTRICAL TERMINALS WITHIN TERMINAL CAVITIES DEFINED BY THE HOUSING SUBASSEMBLY

408

CONNECT THE HOUSING SUBASSEMBLY TO THE COVER SUBASSEMBLY

410

ACCESS AN INTERFACE BETWEEN A PLURALITY OF DC ELECTRICAL CABLES IN THE ELECTRICAL VEHICLE AND THE PLURALITY OF ELECTRICAL BUS BARS THROUGH AN ACCESS PORTAL IN THE COVER SUBASSEMBLY

412

CONNECT THE PLURALITY OF ELECTRICAL BUS BARS TO THE PLURALITY OF DC ELECTRICAL TERMINALS

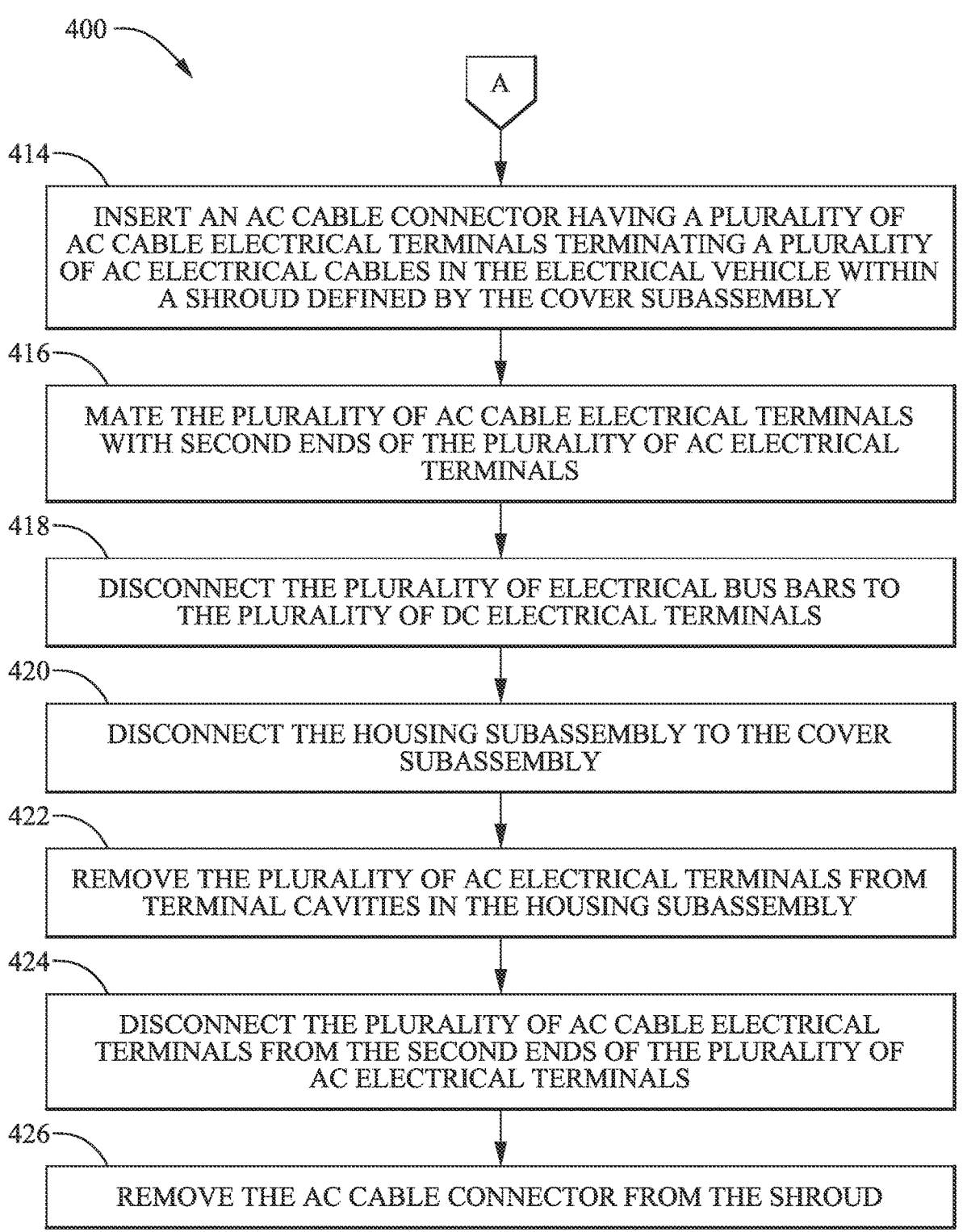

400

A

414

INSERT AN AC CABLE CONNECTOR HAVING A PLURALITY OF AC CABLE ELECTRICAL TERMINALS TERMINATING A PLURALITY OF AC ELECTRICAL CABLES IN THE ELECTRICAL VEHICLE WITHIN A SHROUD DEFINED BY THE COVER SUBASSEMBLY

416

MATE THE PLURALITY OF AC CABLE ELECTRICAL TERMINALS WITH SECOND ENDS OF THE PLURALITY OF AC ELECTRICAL TERMINALS

418

DISCONNECT THE PLURALITY OF ELECTRICAL BUS BARS TO THE PLURALITY OF DC ELECTRICAL TERMINALS

420

DISCONNECT THE HOUSING SUBASSEMBLY TO THE COVER SUBASSEMBLY

422

REMOVE THE PLURALITY OF AC ELECTRICAL TERMINALS FROM TERMINAL CAVITIES IN THE HOUSING SUBASSEMBLY

424

DISCONNECT THE PLURALITY OF AC CABLE ELECTRICAL TERMINALS FROM THE SECOND ENDS OF THE PLURALITY OF AC ELECTRICAL TERMINALS

426

REMOVE THE AC CABLE CONNECTOR FROM THE SHROUD

FIG. 7 CONT'D

SERVICEABLE POWER INLET CONNECTOR

CROSS-REFERENCE TO RELATED APPLICATION

This application claims benefit of priority to U.S. Provisional Patent Application No. 63/243,036 filed on Sep. 10, 2021, the entire disclosure of which is hereby incorporated by reference.

TECHNICAL FIELD

This invention generally relates to electrical connectors used for charging electric vehicles and more specifically to a serviceable power inlet connector.

BACKGROUND

The Combined Charging System (CCS) is a standard for electrical connectors used for charging electric vehicles. It uses alternating current (AC) and direct current (DC) connectors to provide electrical power to the electric vehicle at power levels up to 350 kilowatts. The CCS has a power outlet connector attached to the charging station and a power inlet connector integrated into the electric vehicle. Prior CCS power inlet connectors were generally very cumbersome and difficult to build and assemble. They usually involved processing a large number of wire leads, thus driving a lot of assembly complexity. CCS power inlet connectors are also typically unserviceable and do not include liquid cooling.

BRIEF SUMMARY

According to one or more aspects of the present disclosure, a power inlet connector assembly includes a housing subassembly containing a plurality of direct current (DC) electrical terminals configured to mate with corresponding direct current electrical terminals of a power outlet connector of an electrical vehicle charging device external to the electrical vehicle. The power inlet connector assembly also includes a cover subassembly configured to be connected and disconnected from the housing subassembly. The cover subassembly contains a plurality of electrical bus bars and a plurality of alternating current (AC) electrical terminals having first ends configured to mate with corresponding AC electrical terminals of a power outlet connector of an electrical vehicle charging device. The plurality of electrical bus bars are configured to be connected and disconnected with the plurality of DC electrical terminals and the plurality of AC electrical terminals are configured to be inserted and removed from terminal cavities defined by the housing subassembly.

In one or more embodiments of the power inlet connector assembly according to the previous paragraph, the housing subassembly contains a plurality of signal electrical terminals configured to mate with corresponding signal electrical terminals of the power outlet connector of the electrical vehicle charging device.

In one or more embodiments of the power inlet connector assembly according to any one of the previous paragraphs, the cover subassembly defines a plurality of cable cavities configured to receive a plurality of DC electrical cables in the electrical vehicle that are attached to the plurality of electrical bus bars.

In one or more embodiments of the power inlet connector assembly according to any one of the previous paragraphs, the plurality of cable cavities are oriented parallel to a longitudinal axis of the plurality of electrical bus bars and the cover subassembly is configured to dress the plurality of DC electrical cables in a straight out direction.

In one or more embodiments of the power inlet connector assembly according to any one of the previous paragraphs, the plurality of cable cavities are oriented perpendicularly to a longitudinal axis of the plurality of electrical bus bars.

In one or more embodiments of the power inlet connector assembly according to any one of the previous paragraphs, the cover subassembly may be configured to dress the plurality of DC electrical cables in a rightward direction, in a leftward direction, or in a downward direction.

In one or more embodiments of the power inlet connector assembly according to any one of the previous paragraphs, the cover subassembly defines an access portal located, sized, and arranged to allow tool access to an interface between the plurality of DC electrical cables and the plurality of electrical bus bars. The cover subassembly further includes a removeable access plug configured to enclose the access portal.

In one or more embodiments of the power inlet connector assembly according to any one of the previous paragraphs, the cover subassembly further contains a cooling plate thermally coupled to, but electrically isolated from, the plurality of electrical bus bars.

In one or more embodiments of the power inlet connector assembly according to any one of the previous paragraphs, the cooling plate is liquid cooled.

In one or more embodiments of the power inlet connector assembly according to any one of the previous paragraphs, the cooling plate is air cooled.

In one or more embodiments of the power inlet connector assembly according to any one of the previous paragraphs, the cover subassembly further contains a shroud configured to receive a connector having a plurality of electrical terminals terminating a plurality of AC electrical cables in the electrical vehicle. The plurality of electrical terminals are configured to mate with second ends of the plurality of AC electrical terminals.

In one or more embodiments of the power inlet connector assembly according to any one of the previous paragraphs, the power inlet connector assembly further includes an AC cable connector having a plurality of AC cable electrical terminals terminating a plurality of AC electrical cables in the electrical vehicle. The plurality of AC cable electrical terminals are configured to mate with second ends of the plurality of AC electrical terminals. The cover subassembly further contains a shroud configured to receive the AC cable connector.

In one or more embodiments of the power inlet connector assembly according to any one of the previous paragraphs, the AC cable connector contains a connector subassembly comprising a housing, a connector position assurance (CPA) device, a connector seal configured to seal the housing to the shroud, and a connector seal retainer.

In one or more embodiments of the power inlet connector assembly according to any one of the previous paragraphs, the AC cable connector contains a terminal position assurance (TPA) device in which the plurality of AC electrical terminals are received, a cable seal, and a cable seal retainer disposed within the connector subassembly.

3

According to one or more aspects of the present disclosure, a method of assembling and disassembling a power inlet connector configured for use in charging an electrical vehicle includes the steps of:

providing a housing subassembly containing a plurality of direct current (DC) electrical terminals configured to mate with corresponding direct current electrical terminals of a power outlet connector of an electrical vehicle charging device external to the electrical vehicle;

providing a cover subassembly containing a plurality of electrical bus bars and a plurality of alternating current (AC) electrical terminals having first ends configured to mate with corresponding AC electrical terminals of the power outlet connector of an electrical vehicle charging device;

inserting the plurality of AC electrical terminals within terminal cavities defined by the housing subassembly, connecting the housing subassembly to the cover subassembly; and connecting the plurality of electrical bus bars to the plurality of DC electrical terminals.

In one or more embodiments of the method according to the previous paragraph, the method further includes the steps of:

inserting an AC cable connector having a plurality of AC cable electrical terminals terminating a plurality of AC electrical cables in the electrical vehicle within a shroud defined by the cover subassembly; and mating the plurality of AC cable electrical terminals with second ends of the plurality of AC electrical terminals.

In one or more embodiments of the method according to any one of the previous paragraphs, the method further includes the step of accessing an interface between a plurality of DC electrical cables in the electrical vehicle and the plurality of electrical bus bars through an access portal in the cover subassembly located, sized, and arranged to allow tool access.

In one or more embodiments of the method according to any one of the previous paragraphs, the method further includes the steps of:

disconnecting the plurality of electrical bus bars from the plurality of DC electrical terminals;

disconnecting the housing subassembly from the cover subassembly; and removing the plurality of AC electrical terminals from terminal cavities in the housing subassembly.

In one or more embodiments of the method according to any one of the previous paragraphs, the method further includes the steps of:

disconnecting the plurality of AC cable electrical terminals from the second ends of the plurality of AC electrical terminals; and removing the AC cable connector from the shroud.

According to one or more aspects of the present disclosure, a power inlet connector assembly includes a unitized housing subassembly containing a plurality of electrical terminals configured to mate with corresponding electrical terminals of a power outlet connector of an electrical vehicle charging device external to the electrical vehicle and a unitized cover subassembly configured to be connected and disconnected from the housing subassembly and further configured to connect the plurality of electrical terminals with DC electrical cables and AC electrical cables in the electric vehicle. The housing subassembly and cover subassembly are configured to be separately disconnected and replaced to service the power inlet connector assembly.

4

BRIEF DESCRIPTION OF THE DRAWINGS

The present invention will now be described, by way of example with reference to the accompanying drawings, in which:

FIG. 7 shows a flow chart of a method of assembling and disassembling a power inlet connector configured for use in charging an electrical vehicle according to some embodiments.

DETAILED DESCRIPTION

A power inlet connector for charging an electric vehicle that overcomes the drawback of prior designs is presented herein. Given the large number of mating/unmating cycles typically experienced by the power inlet connector, there is a need to make the power inlet connector a "device" or assembly that is replaceable and/or serviceable, especially when the power inlet connector is liquid cooled. The power inlet connector presented herein is designed to be fully serviceable and provide the "device" that allows the user to plug a power outlet connector directly to it, thus making an electrical wiring harness assembly process of an electrical vehicle much simpler compared to the prior designs. This makes the power inlet connector a "pluggable" solution. The power inlet connector presented here is a serviceable, liquid cooled inlet connector having two subassemblies that can be separately replaced and or serviced by automotive technicians in a vehicle repair facility, such as an automobile dealership. This feature is enabled by a special design of a rear cover subassembly of the power inlet connector.

Figure 1:
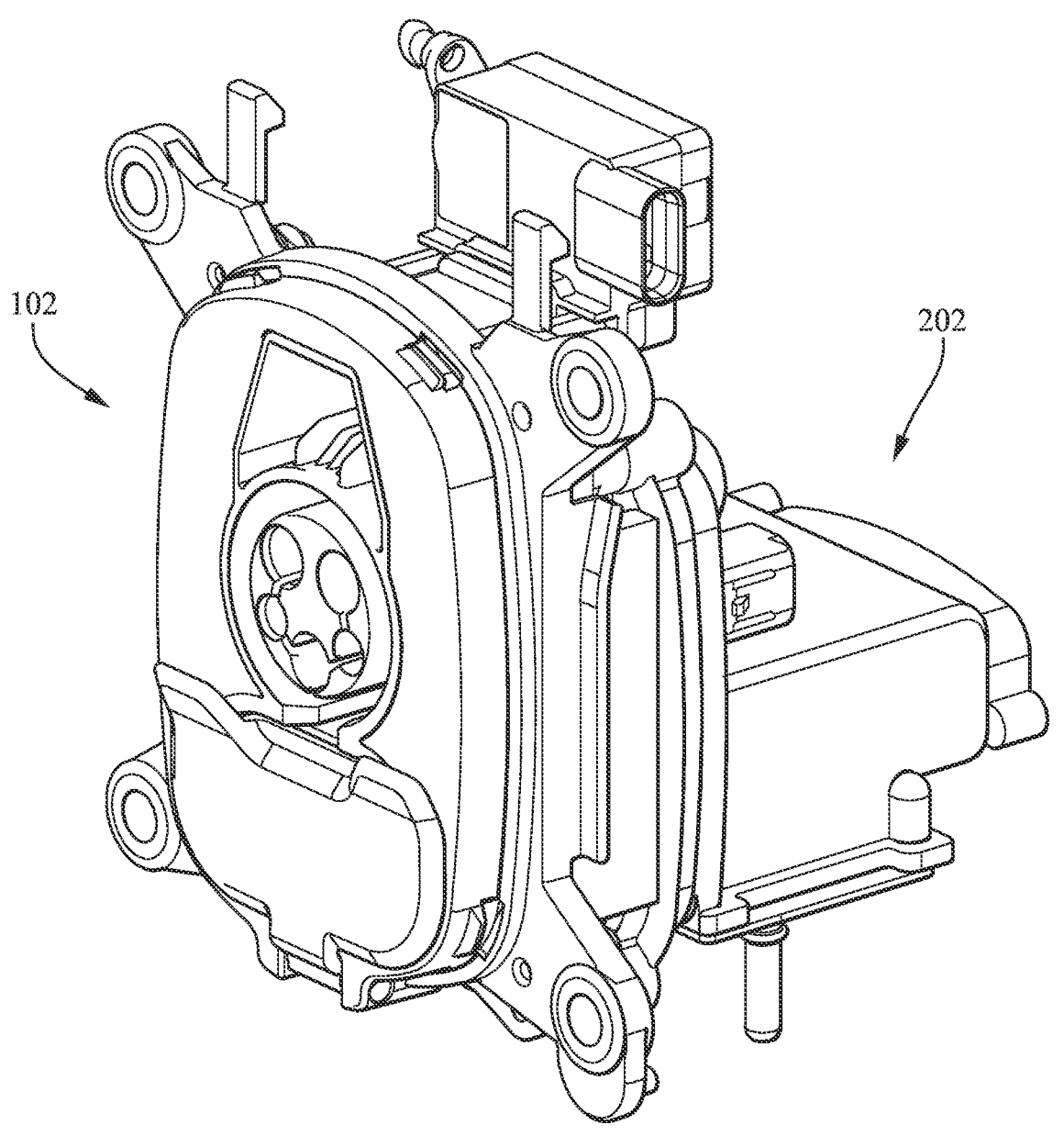
FIG. 1 shows a front perspective view of a power inlet connector assembly configured for use in charging an electrical vehicle according to some embodiments.
Figure 2:
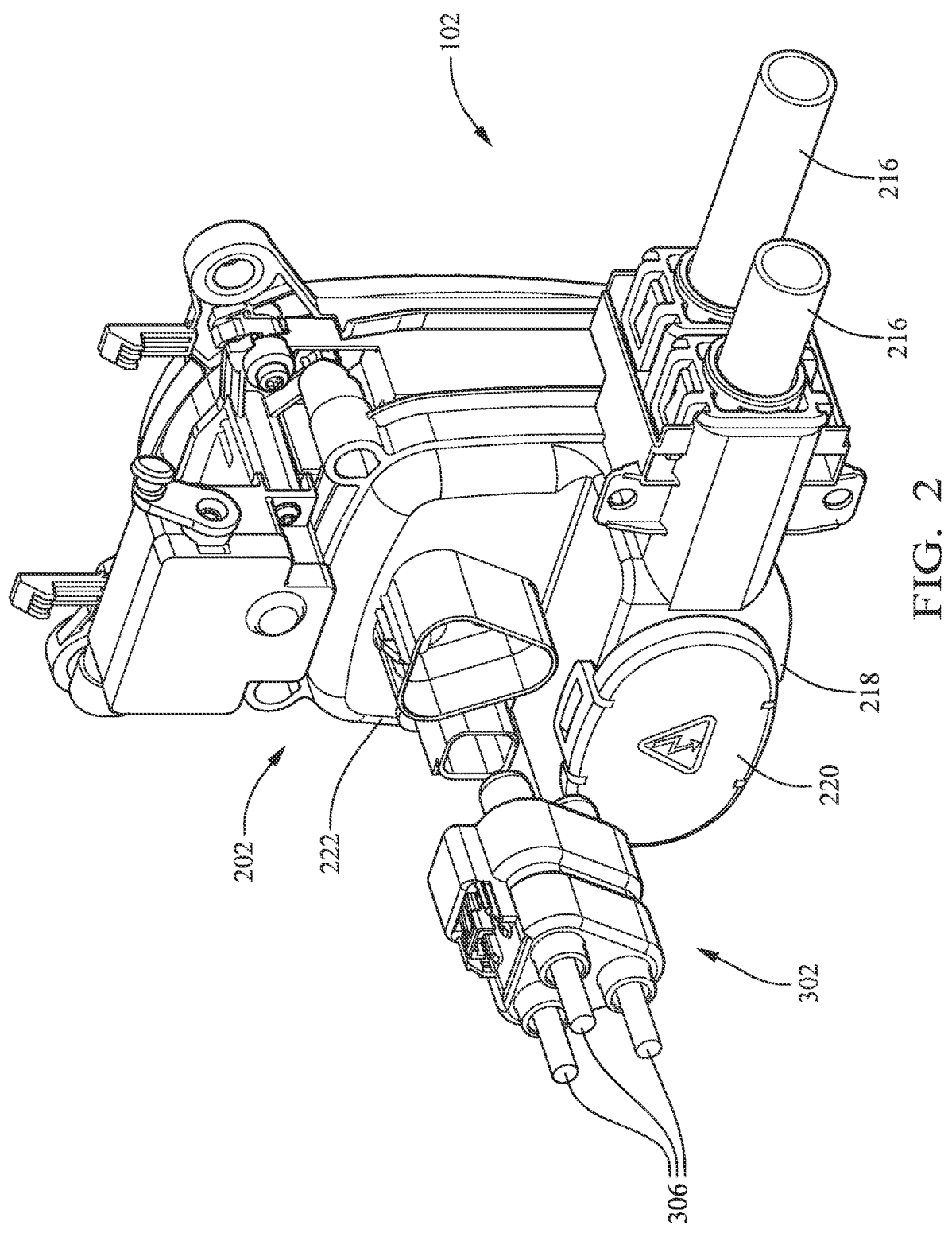
FIG. 2 shows a rear perspective view of the power inlet connector assembly of FIG. 1 according to some embodiments.
Figure 3:
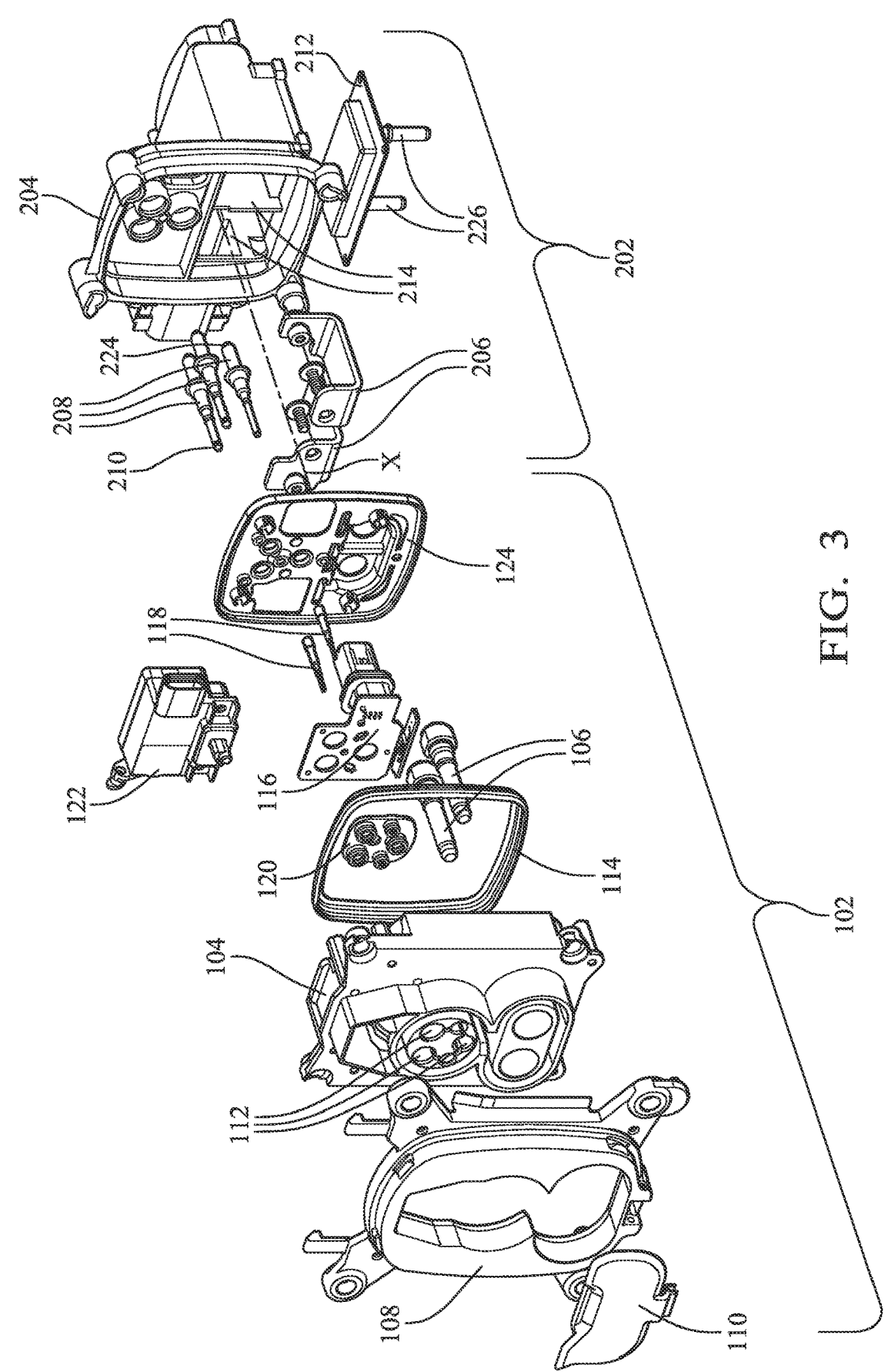
FIG. 3 shows an exploded view of the power inlet connector assembly of FIG. 1 according to some embodiments.

A non-limiting example of a liquid cooled power inlet connector assembly that is configured for use in charging an electrical vehicle, hereafter referred to as the assembly, is shown in FIGS. 1 through 3. The power inlet connector assembly is made up of two individually replaceable subassemblies, specifically a housing subassembly 102 and a rear cover subassembly 202 as described below.

The housing subassembly 102 has a housing 104 containing a pair of direct current (DC) electrical terminals 106 that are configured to mate with corresponding DC electrical terminals (not shown) of a corresponding power outlet connector that is part of an electrical vehicle charging device located externally and separately from the electrical vehicle. The housing subassembly 102 also includes a trim piece 108 that covers a portion of the outer surface of the housing 104 and may include a spring loaded dust cap 110 configured to protect the DC electrical terminals 106 when not in use.

The rear cover subassembly 202 is configured to be connected and disconnected from the housing subassembly 102. The rear cover subassembly 202 has a cover housing 204 containing a pair of electrical bus bars 206 configured to be connected and disconnected with the plurality of DC electrical terminals 106 in the housing subassembly 102. The rear cover subassembly 202 also contains three alternating current (AC) electrical terminals 208 having first ends 210 that are configured to mate with corresponding AC electrical terminals (not shown) of the power outlet connector of the electrical vehicle charging device. The AC electrical terminals 208 are configured to be inserted and removed from terminal cavities 112 defined by the housing subassembly 102. In the example of the power inlet connector assembly illustrated in FIGS. 1-3, the rear cover subassembly 202 also includes a liquid cooled cooling plate 212 that is thermally coupled to the bus bars 206. The cooling plate 212 is electrically isolated from the bus bars 206 to prevent a short circuit between them.

The housing subassembly 102 also includes a peripheral seal 114 that seals the interface between the housing subassembly 102 and the rear cover subassembly 202 to inhibit intrusion of environmental contaminants, such as water, oil, or dust, into the power inlet connector assembly. The housing subassembly 102 also includes controller circuitry 116 for the power inlet connector assembly. The housing subassembly 102 further includes signal terminals 118 configured to connect the controller circuitry 116 to corresponding signal terminals (not shown) in the power outlet connector thereby establishing signal communication between the power inlet connector assembly and the electrical vehicle charging device to manage the DC or AC electrical charging process. The housing subassembly 102 also includes a terminal seal 120 for sealing the signal terminals 118 of the housing subassembly 102 and the AC electrical terminals 208 of the rear cover subassembly 202, an actuator 122, and a retainer 124 for securing these components within the housing subassembly 102. The actuator 122 is configured to lock the power outlet connector of an electrical vehicle charging device to the power inlet connector assembly during charging. This is intended to prevent disconnection during the charging process which may cause arcing and/or exposure to thermally hot terminals.

The rear cover subassembly 202 also includes a pair of cable cavities 214 that are configured to receive DC electrical cables 216 from the electrical vehicle. The DC electrical cables 216 are welded to the bus bars 206, e.g., by using a sonic welding process. The bus bars 206 are also attached to the DC electrical terminals 106 by threaded fasteners (see FIG. 3) through an access portal 218 in the rear cover subassembly 202 that allows tool access to the treaded fasteners. The rear cover subassembly 202 additionally includes a removable access plug 220 configured to enclose the access portal 218.

Figures 4A, 4B, 4C:
FIG. 4A shows perspective view of an alternating current (AC) cable connector having a plurality of electrical terminals terminating a plurality of AC electrical cables in the electrical vehicle configured to connect with the power inlet connector assembly of FIG. 1 according to some embodiments.
FIG. 4B shows an exploded view of the external components of the AC cable connector of FIG. 4A according to some embodiments.
FIG. 4C shows an exploded view of the internal components of the AC cable connector of FIG. 4A according to some embodiments.

A shown in FIG. 2, the rear cover subassembly 202 further contains a shroud 222 that is configured to receive an AC cable connector 302, also shown in FIG. 4A, that has three AC cable electrical terminals 304 terminating three AC electrical cables 306 from the electrical vehicle. The AC cable electrical terminals 304 are configured to mate with second ends 224 of the AC electrical terminals 208 in the rear cover subassembly 202. As shown in FIG. 4B, the AC cable connector 302 contains a connector subassembly 308 made up of a housing 310, a connector position assurance (CPA) device 312, a connector seal 314 configured to seal the housing 310 to the shroud 222, and a connector seal retainer 316. As shown in FIG. 4C, the AC cable connector 302 additionally includes a terminal position assurance (TPA) device 318 in which the AC electrical terminals 208 are received, a cable seal 320, and a cable seal retainer 322 that is disposed within the connector subassembly 308.

Figures 5A, 5B, 5C, 5D:
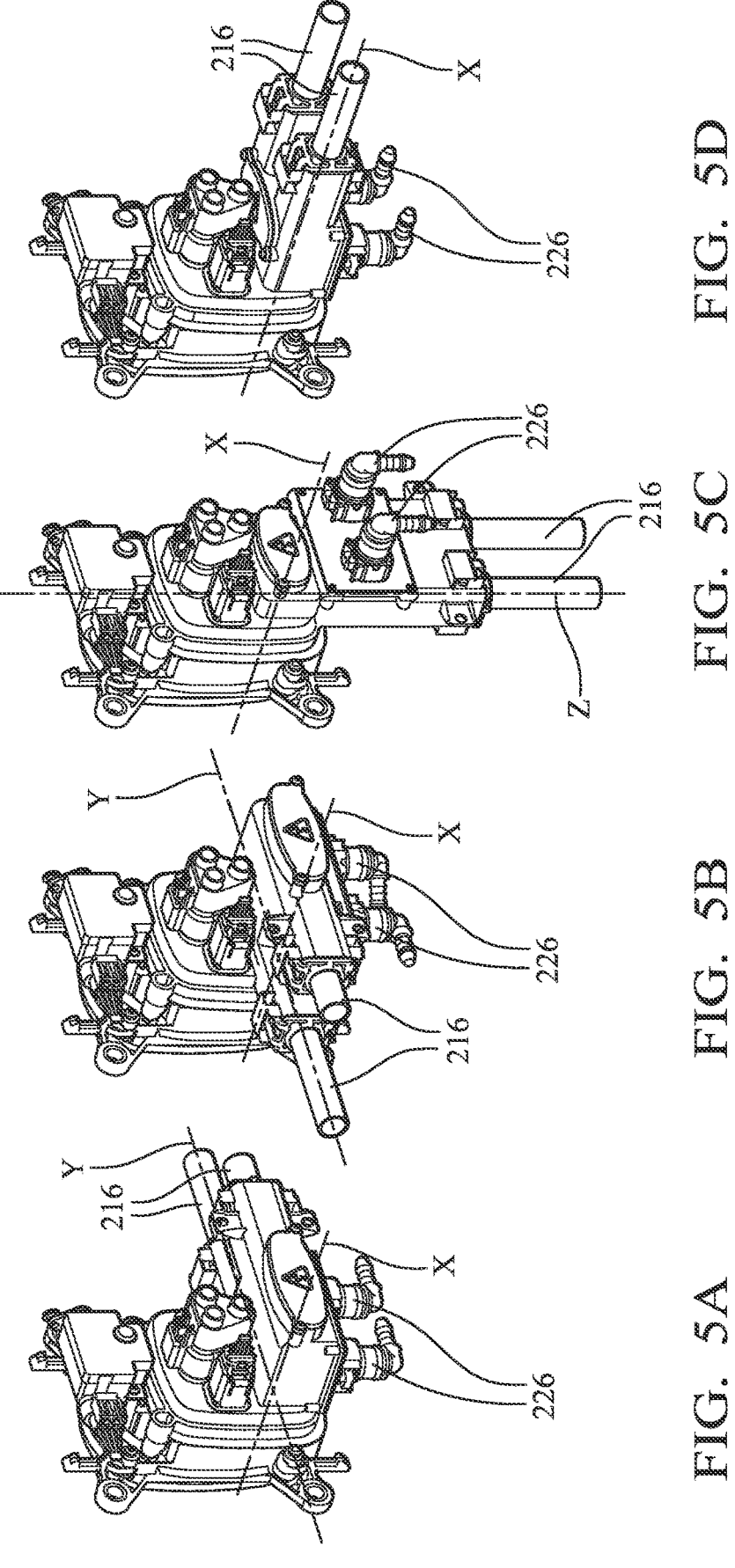
FIGS. 5A-5D show perspective views of various directed current (DC) cable routing and liquid coolant tubing routing options for a power inlet connector assembly according to some embodiments.

FIGS. 5A to 5C show embodiments of the power inlet connector assembly in which the DC electrical cables 216 and coolant connections 226 on the cooling plate 212 are oriented along an axis Y or Z perpendicular to a longitudinal axis X of the bus bars 206 (see FIG. 3). The rear cover subassembly 202 may be configured to dress the plurality of DC electrical cables 216 and coolant lines in a rightward direction (FIG. 5A), in a leftward direction (FIG. 5B), or in a downward direction (FIG. 5C). FIG. 5D shows an embodiment of the power inlet connector assembly in which the DC electrical cables 216 and coolant connections 226 on the cooling plate 212 are oriented parallel to the longitudinal axis X of the bus bars 206 and the rear cover subassembly 202 is configured to dress the DC electrical cables 216 and coolant lines in a straight out direction.

Figure 6:
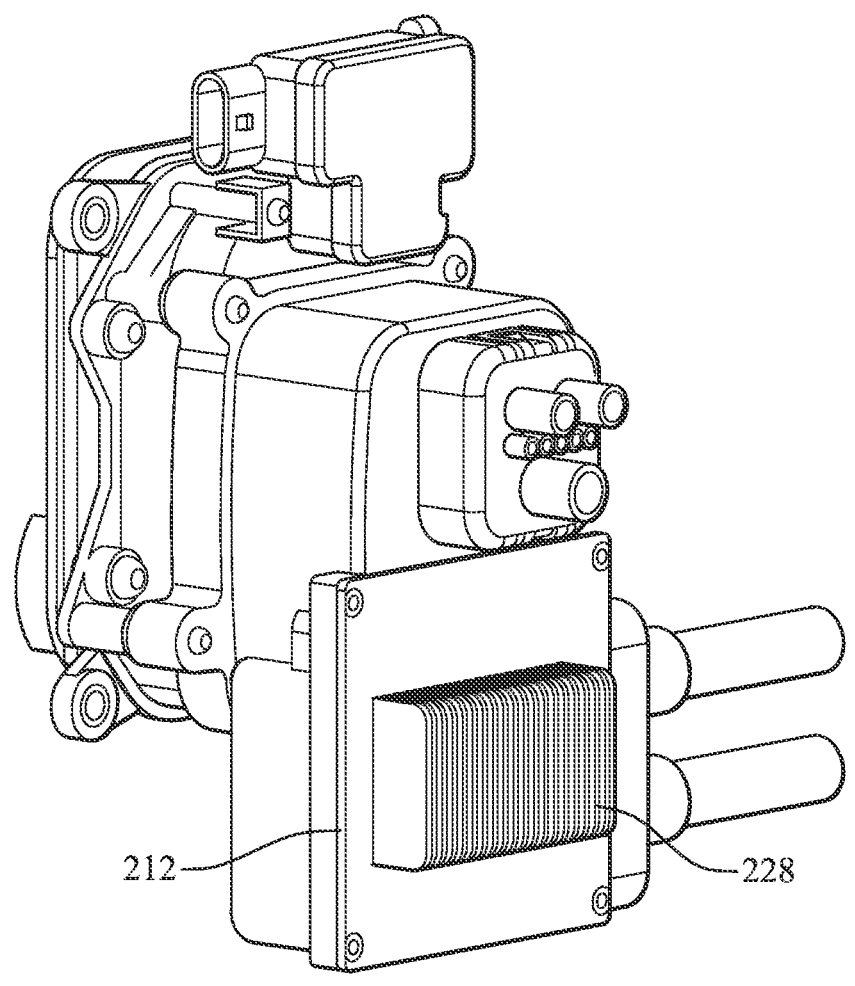
FIG. 6 shows a perspective view of an air cooled embodiment of the power inlet connector assembly according to some embodiments.

FIG. 6 shows an alternative embodiment of the power inlet connector assembly that is air cooled rather than liquid cooled. The cooling plate 212 includes cooling fins 228 on the outside of the rear cover subassembly 202 to draw heat away from the bus bars 206.

FIG. 7 shows a flow chart of a method 400 of assembling and disassembling a power inlet connector configured for use in charging an electrical vehicle. The method includes the steps of:

STEP 402, providing a housing subassembly 102 containing DC electrical terminals 106 configured to mate with corresponding direct current electrical terminals of a power outlet connector of an electrical vehicle charging device external to the electrical vehicle;

STEP 404, providing a rear cover subassembly 202 containing bus bars 206 and AC electrical terminals 208 having first ends 210 configured to mate with corresponding AC electrical terminals of the power outlet connector of an electrical vehicle charging device, STEP 406, inserting the AC electrical terminals 208 within terminal cavities 112 defined by the housing subassembly 102;

STEP 408, connecting the housing subassembly 102 to the rear cover subassembly 202;

STEP 410, accessing an interface between DC electrical cables 216 in the electrical vehicle and the bus bars 206 through an access portal 218 in the rear cover subassembly 202 that is located, sized, and arranged to allow tool access to the interface;

STEP 412, connecting the bus bars 206 to the DC electrical terminals 106;

STEP 414, inserting an AC cable connector 302 having three AC cable electrical terminals 304 terminating a plurality of AC electrical cables 306 in the electrical vehicle within a shroud 222 defined by the rear cover subassembly 202;

STEP 416, mating the plurality of AC cable electrical terminals 304 with second ends 224 of the AC electrical terminals 208;

STEP 418 disconnecting the bus bars 206 from the DC electrical terminals 106;

STEP 420, disconnecting the housing subassembly 102 from the rear cover subassembly 202;

STEP 422, removing the AC electrical terminals 208 from terminal cavities 112 in the housing subassembly 102;

STEP 424, disconnecting the AC cable electrical terminals 304 from the second ends 224 of the AC electrical terminals 208; and STEP 426, removing the AC cable connector 302 from the shroud 222.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A power inlet connector assembly configured for use in charging an electrical vehicle, comprising:
   a housing subassembly containing a plurality of direct current (DC) electrical terminals configured to mate with corresponding direct current electrical terminals of a power outlet connector of an electrical vehicle charging device external to the electrical vehicle; and
   a cover subassembly configured to be connected and disconnected from the housing subassembly, the cover subassembly containing a plurality of electrical bus bars and a plurality of alternating current (AC) electrical terminals having first ends configured to mate with corresponding AC electrical terminals of the power outlet connector of the electrical vehicle charging device, the plurality of electrical bus bars are configured to be connected and disconnected with the plurality of DC electrical terminals and the plurality of AC electrical terminals are configured to be inserted and removed from terminal cavities defined by the housing subassembly, the plurality of electrical bus bars and the plurality of alternating current (AC) electrical terminals are secured within the cover subassembly by a retainer.

2. The power inlet connector assembly according to claim 1, wherein the housing subassembly contains a plurality of signal electrical terminals configured to mate with corresponding signal electrical terminals of the power outlet connector of the electrical vehicle charging device.

3. The power inlet connector assembly according to claim 1, wherein the cover subassembly defines a plurality of cable cavities configured to receive a plurality of DC electrical cables in the electrical vehicle that are attached to the plurality of electrical bus bars.

4. The power inlet connector assembly according to claim 3, wherein the plurality of cable cavities are oriented parallel to a longitudinal axis of the plurality of electrical bus bars and wherein the cover subassembly is configured to dress the plurality of DC electrical cables in a straight out direction.

5. The power inlet connector assembly according to claim 3, wherein the plurality of cable cavities are oriented perpendicularly to a longitudinal axis of the plurality of electrical bus bars.

6. The power inlet connector assembly according to claim 5, wherein the cover subassembly may be configured to dress the plurality of DC electrical cables in a rightward direction, in a leftward direction, or in a downward direction.

7. The power inlet connector assembly according to claim 3, wherein the cover subassembly defines an access portal located, sized, and arranged to allow tool access to an interface between the plurality of DC electrical cables and the plurality of electrical bus bars and wherein the cover subassembly further includes a removeable access plug configured to enclose the access portal.

8. The power inlet connector assembly according to claim 1, wherein the cover subassembly further contains a cooling plate thermally coupled to, but electrically isolated from, the plurality of electrical bus bars.

9. The power inlet connector assembly according to claim 8, wherein the cooling plate is liquid cooled.

10. The power inlet connector assembly according to claim 8, wherein the cooling plate is air cooled.

11. The power inlet connector assembly according to claim 1, wherein the cover subassembly further contains a shroud configured to receive a connector having a plurality of electrical terminals terminating a plurality of AC electrical cables in the electrical vehicle, wherein the plurality of electrical terminals are configured to mate with second ends of the plurality of AC electrical terminals.

12. The power inlet connector assembly according to claim 1, further comprising:

an AC cable connector having a plurality of AC cable electrical terminals terminating a plurality of AC electrical cables in the electrical vehicle, wherein the plurality of AC cable electrical terminals are configured to mate with second ends of the plurality of AC electrical terminals and wherein the cover subassembly further contains a shroud configured to receive the AC cable connector.

13. The power inlet connector assembly according to claim 12, wherein the AC cable connector contains a connector subassembly comprising a housing, a connector position assurance (CPA) device, a connector seal configured to seal the housing to the shroud, and a connector seal retainer.

14. The power inlet connector assembly according to claim 13, wherein the AC cable connector contains a terminal position assurance (TPA) device in which the plurality of AC electrical terminals are received, a cable seal, and a cable seal retainer disposed within the connector subassembly.

15. A method of assembling and disassembling a power inlet connector configured for use in charging an electrical vehicle, comprising:

providing a housing subassembly containing a plurality of direct current (DC) electrical terminals configured to mate with corresponding direct current electrical terminals of a power outlet connector of an electrical vehicle charging device external to the electrical vehicle;

providing a cover subassembly containing a plurality of electrical bus bars and a plurality of alternating current (AC) electrical terminals having first ends configured to mate with corresponding AC electrical terminals of the power outlet connector of the electrical vehicle charging device, inserting the plurality of AC electrical terminals within terminal cavities defined by the housing subassembly;

securing the plurality of electrical bus bars and the plurality of alternating current AC electrical terminals within the cover subassembly using a retainer;

connecting the housing subassembly to the cover subassembly; and connecting the plurality of electrical bus bars to the plurality of DC electrical terminals.

16. The method according to claim 15, further comprising:

inserting an AC cable connector having a plurality of AC cable electrical terminals terminating a plurality of AC electrical cables in the electrical vehicle within a shroud defined by the cover subassembly; and mating the plurality of AC cable electrical terminals with second ends of the plurality of AC electrical terminals.

17. The method according to claim 16, further comprising:

accessing an interface between a plurality of DC electrical cables in the electrical vehicle and the plurality of electrical bus bars through an access portal in the cover subassembly located, sized, and arranged to allow tool access.

18. The method according to claim 16, further comprising:

disconnecting the plurality of electrical bus bars from the plurality of DC electrical terminals;

disconnecting the housing subassembly from the cover subassembly; and removing the plurality of AC electrical terminals from terminal cavities in the housing subassembly.

19. The method according to claim 18, further comprising:

disconnecting the plurality of AC cable electrical terminals from the second ends of the plurality of AC electrical terminals; and removing the AC cable connector from the shroud.

20. A power inlet connector assembly configured for use in charging an electrical vehicle, comprising:

a unitized housing subassembly containing a plurality of DC electrical terminals configured to mate with corresponding electrical terminals of a power outlet connector of an electrical vehicle charging device external to the electrical vehicle; and a unitized cover subassembly securing a plurality of electrical bus bars and a plurality of alternating current AC electrical terminals within the unitized cover subassembly using a retainer, the unitized cover subassembly configured to be connected and disconnected from the housing subassembly and further configured to connect the plurality of DC and AC electrical terminals with DC electrical cables and AC electrical cables in the electric vehicle, wherein the housing subassembly and cover subassembly are configured to be separately disconnected and replaced to service the power inlet connector assembly.

* * * * *